Figure 1:
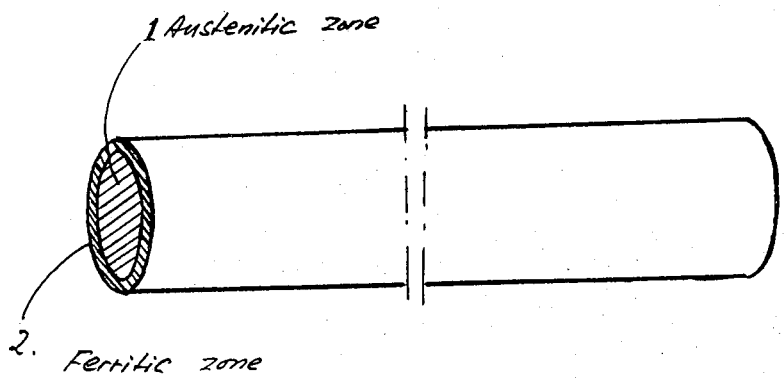

United States Patent
Jansson et al.

[15] 3,693,240
[45] Sept. 26, 1972

[54] METHOD OF MANUFACTURING FILLER MATERIAL FOR WELDING

[72] Inventors: Lars Olov Lennart Jansson; Lars Gösta, Ljungström, both of Sandviken, Sweden

[73] Assignee: Sandvikens Jernverks Aktiebolag, Sandviken, Sweden

[22] Filed: Aug. 24, 1970

[21] Appl. No.: 66,417

[30] Foreign Application Priority Data

Aug. 27, 1969    Sweden.....................11853

[52] U.S. Cl. .............29/474.3, 29/191.6, 29/196.1, 29/475, 29/504, 148/127
[51] Int. Cl. .......................................B21d 39/04
[58] Field of Search.......29/473.3, 191.6, 196.1, 475, 29/504, 474.3; 148/127

[56] References Cited

UNITED STATES PATENTS

| | | | |
|---|---|---|---|
| 2,107,943 | 2/1938 | Hopkins | 29/473.3 |
| 2,213,390 | 9/1940 | Franklin | 29/473.3 |
| 2,231,917 | 2/1941 | Jones | 29/473.3 |
| 3,054,176 | 9/1962 | Beneke | 29/473.3 X |
| 3,096,577 | 7/1953 | Carlson et al | 29/473.3 |
| 3,320,666 | 5/1967 | Dion | 29/473.3 |
| 3,514,840 | 6/1970 | Pitter | 29/473.3 X |
| 3,562,899 | 2/1971 | Stout et al | 29/473.3 X |
| 2,759,249 | 8/1956 | Eberle | 29/196.1 |
| 2,769,227 | 11/1956 | Sykes | 29/196.1 |
| 2,963,129 | 12/1960 | Eberle | 29/196.1 X |
| 3,499,803 | 3/1970 | Henrickson et al | 29/196.1 X |
| 3,537,828 | 11/1970 | Henrickson et al | 29/196.1 |
| 3,650,709 | 3/1972 | Morsing | 29/196.1 |

OTHER PUBLICATIONS

Welding Handbook Section 4 Fifth Edition published 1966 pages 65.40- 65.42

*Primary Examiner*—John F. Campbell
*Assistant Examiner*—Richard Bernard Lazarus
*Attorney*—Pierce, Scheffler & Parker

[57] ABSTRACT

Hot working a welding rod or strip to form a composite body consisting of a tubular case or sheath of one material surrounding a core of a different material. One of the two materials is ferritic metal whilst the other of the two materials is austenitic metal. The resulting weld consists essentially of a stainless steel.

9 Claims, 2 Drawing Figures

1. Austenitic zone
2. Ferritic zone

1. Austenitic zone
2. Ferritic zone

Inventors
LARS OLOV LENNART JANSSON
LARS GÖSTA LJUNGSTRÖM

METHOD OF MANUFACTURING FILLER MATERIAL FOR WELDING

The present invention relates to a method of manufacturing filler material, for welding, in the form of wire, strip, rods and the like. The resulting weld deposit is a stainless, ferrite-austenitic, steel which for the main part is deposited from this filler material.

It heretofore had been proposed to manufacture filler materials of stainless steel, substantially austenitic but also ferrite-austenitic materials, for welding of different kinds of corrosion- and heat-resistant steels. As a rule, the filler material (e.g., welding wire) has been manufactured by means of conventional methods meaning, i.e., hot working by forging, rolling or extrusion of ingots and billets, with subsequent cold drawing or cold rolling and different finishing operations.

It is well known that serious problems attend the production of filler materials of ferrite-austenitic stainless steels, and that this is especially true with respect to filler material in certain composition ranges concerning the ferrite-austenitic structure. These problems are connected with the difficulties in hot-working a steel body having a two-phase structure. The different groups of ferrite-austenitic stainless steels may be distinguished in this matter. In the first case, the steel is substantially composed of an austenitic matrix in which there is a certain amount of ferrite. With increasing content of ferrite — for example, in the range of 0–25 weight percent, increased difficulties in hot working will occur. In the second case, the steel substantially consists of a ferritic matrix in which there is a certain amount of austenite. In that case, the difficulties in hot working increase with increasing content of austenite from 0 percent and up, for instance between 0 and 25 percent. Particularly during the break down of the coarse ingot structure, cracks are often formed in the corners of the rolled billet, thereby causing rejections. These difficulties occur in forging as well as in rolling. The two-phase structure is also very notch-sensistive in the case of surface defects, and the cracks usually start from the surface.

On manufacturing welding wire, welding strip and the like, consisting of the mentioned stainless steel, it heretofore has been necessary — because of cracks and other surface defects — to have an extensive surface treatment of the billet,— for instance, grinding of blanks, turning of wire and edge-cutting of strip. Furthermore, the group of ferrite-austenitic steels have substantially a ferritic matrix demands relatively high temperature on hot-working in order to avoid formation of sigma phase. The ferrite is soft compared to the austenite: this causes problems on hot-working; for instance, rolling in reversing guides cannot be done. Manufacture of wire for automatic welding use, in which operation a blank and smooth surface is required, is complicated and expensive by reason of this.

The above-mentioned, and other drawbacks have been eliminated by the present invention. A method has thus been made available which permits manufacturing filler material for welding, in the physical form of wire, strip rod or the like; without any particular difficulties in hot-working of billets or ingots or in the following cold-working and finishing operations.

The invention is substantially characterized in that the filler material, usually in the form of a billet or ingot, is provided in such manner that the material during hot-working is composed of at least one zone of substantially solely austenitic structure and at least one zone of substantially solely ferritic structure. In such prepared filler materials, in which the austenitic and the ferritic parts are usually symmetrically distributed and extend along the whole length of the welding wire (or welding strip), the different structure components will melt together in use in the eventual welding. By that means, the result and the analyses of the weld deposit are mainly the same as when using a filler material with a mean analysis corresponding to the two-phase ferrite-austenitic alloy without dividing it into components having different structures.

It may often be advantageous to have the filler material composed partly of a core in a ferritic material, partly of a surrounding case, sheath or jacket consisting essentially of austenitic material. In this way, for instance, in rolling of wire of a ferrite-austenitic steel with a substantially ferritic matrix, it is possible to obtain a hard outer part which is not scratched during the operation involving, for instance, rolling with reversing guides at relatively high temperature.

On the other hand, it may sometimes also be advantageous that the filler material be composed partly of a core of austenitic material and partly of a surrounding case, sheath or jacket of a ferritic material.

As been mentioned earlier, an increase of the ferrite content in an austenitic matrix, respectively, an increase of the austenite content in a ferritic matrix, causes increased difficulties in hot-working. Among important steel compositions, for which the working has earlier been a great problem, may be mentioned ferrite-austenitic steels having either (a) between 5 and 50 percent ferrite, usually 8–25 percent ferrite, in an austenitic matrix or (b) such steels having between 5 and 50 percent austenite, usually 8–25 percent austenite, in a ferritic matrix. These grades or qualities have by the present invention not been made possible in the manufacture of different products, as for instance filler material for welding.

Among filler materials which preferably may be manufactured according to the invention, welding wire is primarily noticed. It is suitable to start from cylindrical billets or ingots which are composed of a tubular case or sheath and a central cylindrical core. The core may consist of ferritic material and the case of austenitic material, or, inversely (depending on the desired total composition of the welding wire, the hot working method used and so on) the core may be austenitic and the surrounding case ferritic material.

As an example of the manufacture of welding wire in a steel quality difficult to hot-work may be mentioned the following application of the invention.

Heretofore there were great difficulties in manufacturing welding wire of a substantially ferrite-austenitic steel containing about 18 percent Cr, about 4.5 percent Ni, about 0.05 percent C besides some Si, Mn and Mo. According to the invention, there was made a composite billet having a core consisting of a ferritic steel containing about 17 percent Cr and about 0.08 percent C, and a surrounding tubular case consisting of an austenitic steel containing about 18.5 percent Cr, about 9 percent Ni and about 0.05 percent C. This so-called compound or composite billet was heated to 1,200° C. and extruded, thereby reducing the dimension of the billet from about 190 mm diameter to 80 mm diameter. Then the billet was hot-rolled, after heating to about 1,150° C., thereby effecting a final wire dimension of 6 mm diameter. After the hot-rolling, the wire was cold drawn to about 3 mm diameter, whereupon the wire was cut in pieces used as electrodes. The whole manufacturing process was done without problems, and no cracking or other surface defects could be observed in the article after the hot-rolling. In this case, the original compound billet was made by placing a rod of the mentioned ferritic steel in a tube of the austenitic steel, holding the parts together by welding. Among other methods, suitable for preparing of such billets, may be mentioned direct casting of the compound billet.

Other embodiments or types of filler materials, such for instance as welding strips, may be manufactured in similar ways. A billet for a welding strip may, thus, be built according to the compound or "sandwich" principle, having for instance a ferritic middle part surrounded by austenitic material on its upper and lower faces or possibly on all faces of the core. The parts may suitably be fixed by means of welding. By hot and cold working, welding strips can then be manufactured without difficulty.

The invention is illustrated in the accompanying drawing, in which

Figure 2:
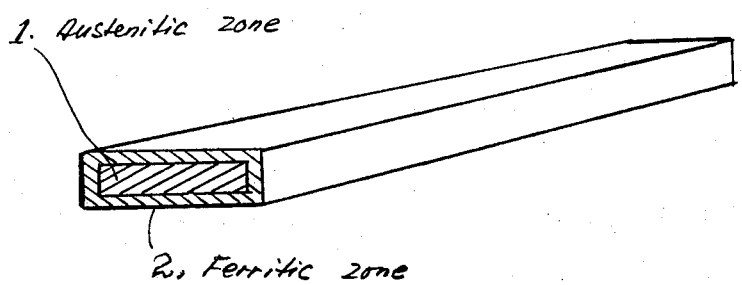

FIG. 1 is a perspective view of a composite wire or rod embodying the principle of the present invention, and FIG. 2 is a view similar to that of FIG. 1 except that the product is in the form of a strip instead of a wire or rod.

In these illustrations the core 1 of the product has been indicated to be an austenitic zone, while the sheath or case 2 has been indicated to be a ferritic zone.

As has been explained hereinabove, the disposition of the two components in the product may be reversed, the core zone being ferritic material while the outer sheath or case is austenitic.

We claim:

1. In a method of forming a welding rod or welding strip, consisting of a core and a surrounding case, comprising hot working a billet, the improved procedure according to which the billet during such hot working is composed of two distinct members one member being austenitic stainless steel structure and the other member being ferritic steel structure, one member providing the core and the other member providing the case of such welding rod or strip, said members extending along the whole length of the welding rod or strip whereby the cross section of the billet is reduced during the hot working.

2. Improved method according to claim 1, in which the ferritic steel member constitutes 5-50 percent of the total weight of the billet, the remainder being austenitic stainless steel material.

3. Improved method according to claim 1, according to which the ferritic steel member constitutes 8-25 percent of the total weight of the billet, the remainder being austenitic stainless steel material.

4. Improved method according to claim 1, in which the austenitic stainless steel constitutes 5-50 percent of the total weight of the billet member, the remainder being ferritic steel material.

5. Improved method according to claim 1, according to which the austenitic stainless steel constitutes 8-25 percent of the total weight of the billet member, the remainder being ferritic steel material.

6. Improved method according to claim 1, according to which the billet is composed of (1) a core consisting of ferritic steel material and of (2) a surrounding case consisting of austenitic stainless steel material.

7. Improved method according to claim 1, according to which the billet is composed of (1) a core consisting of austenitic stainless steel material and of (2) a surrounding case consisting of ferritic steel material.

8. Improved method according to claim 1, according to which the billet is cylindrical and consists of a tubular case and an inner cylindrical core.

9. Improved method according to claim 1, according to which the billet is of the sandwich-type in which the components are held together by means of welding.

* * * * *